United States Patent [19]

Davis

[11] 3,711,138
[45] Jan. 16, 1973

[54] FASTENING DEVICES
[75] Inventor: Maurice Davis, West Croydon, England
[73] Assignee: Davis Industrial (Equipment) Limited, Croydon, England
[22] Filed: Jan. 27, 1970
[21] Appl. No.: 6,216

[52] U.S. Cl.................287/189.36 F, 85/9 R, 85/45, 85/46
[51] Int. Cl.............................................F16b 5/02
[58] Field of Search..................85/46, 32 W, 41, 36; 287/189.36 F

[56] References Cited

UNITED STATES PATENTS

| | | | |
|---|---|---|---|
| 318,618 | 5/1885 | Hawkins | 85/32 W |
| 984,969 | 2/1911 | Reiniger | 85/46 |
| 1,260,154 | 3/1918 | Day | 85/46 |
| 2,697,873 | 12/1954 | Cooke | 85/1 JP |
| 3,478,639 | 11/1969 | Gruca | 85/46 |
| 1,177,810 | 4/1916 | Rogness | 85/41 |
| 2,000,732 | 5/1938 | Zelt | 85/36 |
| 3,018,685 | 1/1962 | Squire | 85/36 |
| 3,541,918 | 11/1970 | Johnson | 85/46 |

FOREIGN PATENTS OR APPLICATIONS

| | | | |
|---|---|---|---|
| 522,256 | 6/1940 | Great Britain | 85/32 W |
| 759,020 | 10/1956 | Great Britain | 85/50 R |
| 1,036,336 | 7/1966 | Great Britain | 287/189.36 F |

Primary Examiner—Edward C. Allen
Attorney—Holcombe, Wetherill & Brisebois

[57] ABSTRACT

A fastening device for rapidly securing two parts, such as an inspection plate or cover on a main frame or casing in which the cover and frame or casing have plain holes drilled, stamped or otherwise formed therein so as to be in register in the assembled condition, the fastener having a helical land engageable with a pair of such holes by rotation while inclined to the plane of each hole and by continued rotation being movable relative to the cover and frame or casing to bring the margins defining the holes into engagement between a head of the fastener and an end face of the land which terminates short of the head.

7 Claims, 14 Drawing Figures

PATENTED JAN 16 1973 3,711,138

INVENTOR
MAURICE DAVIS
BY
Holcombe, Wetherill + Brisebois
ATTORNEY

FASTENING DEVICES

This invention is concerned with improvement in and relating to fastening devices.

According to the present invention there is provided a fastening device comprising a head, a shank and a land which terminates short of the head, defines with the head a pair of opposed clamping faces and has a helical face directed away from the head.

According to the present invention there is provided a pair of elements, each having an aperture and a fastening device having a head, a shank and a land which terminates short of the head, defines with the head a pair of opposed axially directed clamping faces and has a helical face directed away from the head, a margin adjacent each aperture being clamped between the axially directed faces and each aperture having a diameter equal to the shank diameter plus the depth of a land so that the device may be engaged in an aperture by being offered to the aperture with its axis at an angle to the axis of the aperture and by then rotating the device about its axis, the pitch of the land being greater than the thickness of an element.

The resilient element may be an annular pad and may suitably be located between the head and the adjacent element or between the elements.

In order that the present invention may be well understood there will now be described some embodiments thereof, given by way of example only, reference being had to the accompanying drawing in which.

Figure 1:
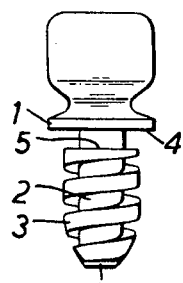
FIG. 1 is an elevation of a fastener.

Referring to FIG. 1, the fastening device comprises a head 1 from which extends a shank 2 on which is a helical land 3 terminating short of an axially directed face 4 of the head. The land is of progressively diminishing axial thickness for approximately the last 180° before its end nearest the head to present a face 5 axially oppositely directed relative to face 4 of the head and parallel thereto.

The helical land at the end 6 of the shank remote from the head is shown as tapered but this is not essential serving only as an aid in using the fastening device.

The fastening device is at present primarily designed to clamp two sheets or elements together between which will be a resilient element, such as a foamed synthetic plastics gasket or pad. The pad may, for example, be an annulus preferably of internal diameter at least equal to the external diameter of the helical land. The pitch of the land is greater than the thickness of each sheet and as can be seen in FIGS. 2 and 3 the hole in a sheet 7 to be clamped is of a diameter equal to the shank diameter plus the depth of the land plus a small working clearance.

The distance between faces 4 and 5 is set as the total thickness of the sheets plus the thickness of the gasket or pad therebetween in a compressed state.

The holes in the sheets are preferably round and may be formed by being simply drilled or stamped out, no tapping being necessary nor the provision of anchored nuts.

Figure 2:
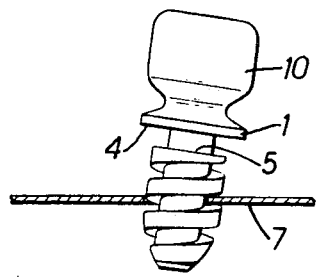
FIG. 2 is an elevation of a fastener partly home in a plate.
Figure 3:
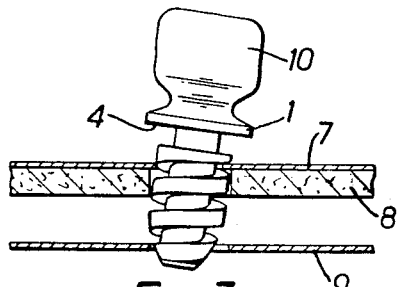
FIGS. 3 and 4 show a fastener respectively partly and fully home in relation to two plates with a resilient gasket adherent to one of them.

To insert the fastening device into a sheet, the device is offered to the hole in the sheet at an angle as seen in FIG. 2 so that the leading end of the land engages under the lip of the hole. Now as the device turns, the land progressively engages under the lip of the hole so that the lip of the hole at one point is adjacent the shank and a diametrically opposite point on the lip is adjacent the peak of the land. The sheet moves relatively up the shank until the margin round the hole lies between the faces 4 and 5 where the margin is slack allowing the device to be tilted.

Figure 4:
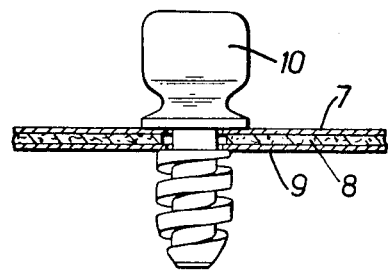

In FIG. 3 a resilient gasket 8 is shown fast to sheet 7 but the gasket or pad may be a separate entity. The fastening device is engaged in a second sheet 9 either when the first sheet 7 has arrived between faces 4 and 5 or before this has occurred. The second sheet 9 will be drawn relatively up the shank of the fastening device and will as it approaches sheet 7 compress the gasket 8 and the situation shown in FIG. 4 will be achieved when the sheets 7 and 9 and the compressed gasket 8 are clamped between the faces 4 and 5. The gasket will keep the shank substantially normal to the sheets and force the sheets against faces 4 and 5 so that even if the fastening device turns about its axis relative to the sheets, the end of the land adjacent the head will not engage over the lip of the hole in plate 9 and thereby start a disengaging movement.

To disengage the fastening device the head has to be turned relative to the sheets while the shank is tilted relative to the sheets. This will enable the end of the land adjacent the head to start to disengage from sheet 9. Thereafter the disengagement continues by merely turning the head and can be continued to disengage either plate 9 alone or both sheets.

Figure 8:
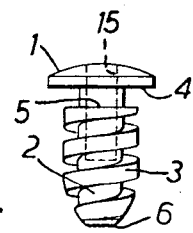
FIG. 8 is a cross section of another embodiment of fastener.
Figure 9:
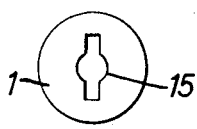
Figure 10:
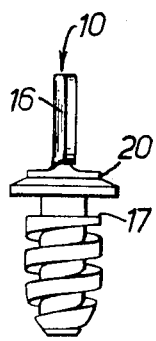
Figure 11:
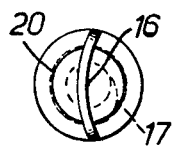
Figure 12:
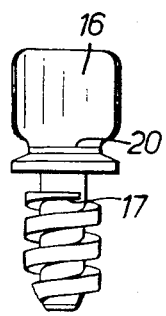
Figure 13:
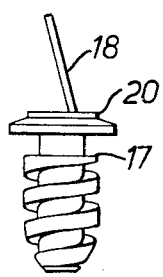
Figure 14:
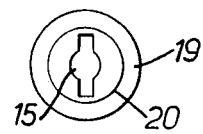

This particular arrangement for clamping two sheets with a resilient member therebetween is particularly advantageous for such things as cover or inspection plates where a resilient gasket extends thereabout or about the aperture which they cover. Thus an elongate rectangular cover plate for an aperture in a casing might have a fastening device at each shorter side each engaging a simple hole in the plate and a simple hole in the casing, no tapped bushes, nuts or self-tapping screws being needed. When the devices are engaged in the casing and run home there is no problem of stripping any threads by over-tightening. The fastening devices for cheapness may be made by injection moulding from synthetic plastics material and may have a finger piece 10 for manipulation or may be formed with a groove or recess for engagement by a screw driver or as a square or hexagon for engagement by an open jaw or box spanner or as a winged head. As shown in FIG. 8 a recess 15 may be provided which is engageable by a tool to turn the fastener and which is deep enough to enable an operator to tilt the tool and thereby tilt the fastener to effect disengagement.

Figure 5:
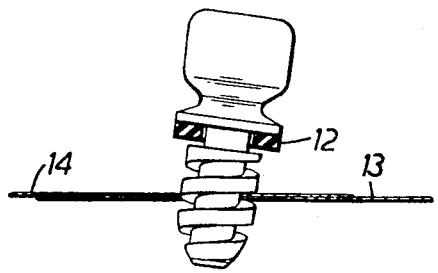
FIGS. 5 and 6 show another embodiment of fastener respectively partly and fully home in relation to two plates to be clamped face-to-face.
Figure 6:
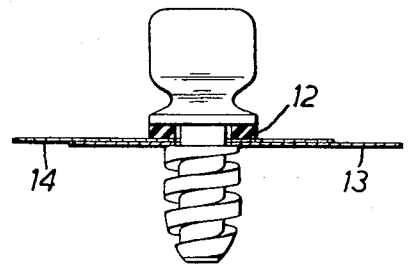

Referring to FIGS. 5 and 6 there is shown a fastening device having a resilient element 12 provided under the face 4, the element being for example a rubber washer or a spring washer. This enables a pair of plates 13, 14 to be clamped provided that the plates are taken up the shank one by one or provided that the total plate thickness is sufficiently less than the pitch of the helix to allow the plates to lie in between adjacent turns as shown in FIG. 5. The end condition is seen in FIG. 6 where the plates and the resilient element are clamped together between faces 4 and 5, the element 12 providing the clamping force urging the plate 13 against face 5 and hence preventing the end of the land from engaging over the plate in a disengaging movement.

Figure 7:
FIG. 7 shows various types of thread form for the fastener.

Various land cross sections may be adopted such as those shown in FIG. 7.

The applications of the fastening device are numerous and among them may be mentioned the fastening of metal or hard board sheets for example over the rear of wireless and television sets, the closure of access panels and switchgear cabinets, the fastening of inspection covers as mentioned above. The fastening device may be made from a variety of different materials depending upon the use, e.g., stainless steel for inspection covers in plant or machinery where chemical attack or temperature would eliminate the use of synthetic plastics.

I claim:

1. In combination, a fastening device and at least one substantially flat member having a circular aperture in which said fastening device is inserted, said fastening device comprising an elongated cylindrical shank, a head at one end of said shank having a diameter greater than that of said shank, and a helical land on said shank which terminates short of said head in a portion of progressively diminishing axial thickness to form a surface facing said head which is perpendicular to the axis of said shank, said head having a surface facing said land which is likewise perpendicular to the axis of said shank, the diameter of said shank between said head and perpendicular surface being at least as great as the diameter of said shank on the opposite side of the land portion of diminishing axial thickness from said head and the diameter of said aperture being at least equal to the diameter of said shank between said head and land, plus the radial depth of a land, but less than the outer diameter of the land, and the width of the groove defined by said land being substantially uniform and greater than the thickness of said at least one member throughout the length of said land.

2. The combination according to claim 1 in which the fastening device includes a socket for engagement by a tool to turn and tilt the fastening device.

3. The combination according to claim 1 in which the fastening device includes a finger piece having a concave face to that side on which lies the end of the land adjacent the head.

4. The combination according to claim 1 in which the fastening device includes a finger piece inclined away from that side on which lies the end of the land adjacent the head.

5. The combination claimed in claim 1 which comprises a resilient member mounted on said shank between said head surface and said flat member.

6. In combination, a fastening device and a pair of substantially flat members having a circular aperture in which said fastening device is inserted, said fastening device comprising an elongated cylindrical shank, a head at one end of said shank having a diameter greater than that of said shank, and a helical land on said shank which terminates short of said head in a portion of progressively diminishing axial thickness to form a surface facing said head which is perpendicular to the axis of said shank, said head having a surface facing said land which is likewise perpendicular to the axis of said shank, the diameter of said shank between said head and perpendicular surface being at least as great as the diameter of said shank on the opposite side of the land portion of diminishing axial thickness from said head and the diameter of said aperture being at least equal to the diameter of said shank between said head and land, plus the radial depth of a land, but less than the outer diameter of the land, and the width of the groove defined by said land being substantially uniform and greater than the thickness of said at least one member throughout the length of said land, said members being positioned between said head and said land, with one member having a first surface adjacent said head surface to form therewith a first pair of adjacent surfaces, and the other member having a first surface adjacent said land surface to form therewith a second pair of adjacent surfaces, and both members having a second surface, said second surfaces being adjacent each other to form a third pair of adjacent surfaces, and a resiliently compressible element held under compression between one of said pairs of adjacent surfaces.

7. In combination, a fastening device and a pair of substantially flat members having a circular aperture in which said fastening device is inserted, said fastening device comprising an elongated cylindrical shank, a head at one end of said shank having a diameter greater than that of said shank, and a helical land on said shank which terminates short of said head in a portion of progressively diminishing axial thickness to form a surface facing said head which is perpendicular to the axis of said shank, said head having a surface facing said land which is likewise perpendicular to the axis of said shank, the diameter of said shank between said head and perpendicular surface being at least as great as the diameter of said shank on the opposite side of the land portion of diminishing axial thickness from said head and the diameter of said aperture being at least equal to the diameter of said shank between said head and land, plus the radial depth of a land, but less than the outer diameter of the land, and the width of the groove defined by said land being substantially uniform and greater than the thickness of said at least one member throughout the length of said land and resilient means gripped between said flat members.

* * * * *